US005605982A

United States Patent [19]

Chao et al.

[11] Patent Number: 5,605,982
[45] Date of Patent: Feb. 25, 1997

[54] SHEET AND TUBE SILOXANE POLYMERS

[75] Inventors: Timothy C. Chao, Cleveland; Malcolm E. Kenney, Cleveland Heights, both of Ohio; Dimitris E. Katsoulis, Midland, Mich.

[73] Assignees: Dow Corning Corporation, Midland, Mich.; Case Western Reserve University, Cleveland, Ohio

[21] Appl. No.: 542,081

[22] Filed: Oct. 12, 1995

[51] Int. Cl.$^6$ .................................................. C08G 77/00
[52] U.S. Cl. .......................... 525/474; 525/475; 525/478; 523/212; 523/213; 524/588; 524/862; 528/9; 528/15; 528/31; 528/25; 528/39; 528/32
[58] Field of Search .................. 528/39, 15, 31, 528/32, 9; 523/212, 213; 525/474, 475, 478; 524/862, 588

[56] References Cited

U.S. PATENT DOCUMENTS

| | | | |
|---|---|---|---|
| 3,661,846 | 5/1972 | Kenney | 260/46 |
| 3,692,816 | 9/1972 | Faille et al. | |
| 3,839,062 | 10/1974 | Mercier et al. | |
| 3,862,259 | 1/1975 | Van Russelt et al. | |
| 3,904,583 | 9/1975 | Sanders et al. | |
| 4,137,367 | 1/1979 | Sample | |
| 4,268,574 | 5/1981 | Peccenini et al. | 428/315 |
| 4,289,651 | 9/1981 | Benton et al. | 252/429 B |
| 4,621,024 | 11/1986 | Wright | 428/404 |
| 4,683,318 | 7/1987 | Deffeves et al. | 556/173 |
| 4,786,558 | 11/1988 | Sumiya et al. | 428/454 |
| 4,911,982 | 3/1990 | Rice | 428/404 |
| 4,942,026 | 7/1990 | Gupta | 423/326 |
| 4,960,816 | 10/1990 | Rice | 524/425 |
| 5,328,683 | 7/1994 | Harashima | 424/63 |
| 5,514,734 | 5/1996 | Maxfield et al. | 523/204 |
| 5,527,871 | 6/1996 | Tani et al. | 528/10 |

FOREIGN PATENT DOCUMENTS 2546061  10/1974  Germany.

OTHER PUBLICATIONS

Polymer Reprints, vol. 32, No. 3, Aug. 1991, 508–509.
Colloids & Surfaces, 63, (1992), 139–149.
Rodrique, L.; Brotelle-Pacco, F. J. Microsc. Biol. Cell. (1975), 24, 217.
Borrios-Neira, J.; Rodrique, L.; Ruiz-Hitzky, E. J. Microsc. (Paris) (1974), 20(3), 295.
Yamashita, Y.; Kaziwara, M. J. Inorg. Organomet. Polym. (1992), 2(1), 129.
Yamashita, Y.; Kaziwara, M. J. Electrochem. Soc., (1990), 137(10), 3253.
Kohama, S. Kagakuto Kogyo (Osaka), (1981), 55(10), 365. Chem. Abstr. 96:45185.
Kohama, S. Kagakuto Kogyo (Osaka), (1981), 55(10), 365. Chem. Abstr. 1982, 96, 45185.
Edwards, H. J. Appl. Chem. (1970), 20, 76.
Ruiz-Hitzky, E.; Fripiat, J. J. Clays Clay Miner. (1976), 24(1), 25.
Ruiz-Hitzky, E., Fripiat, J. J. Bull Soc. Chim. Fr. (1976), 1341.
Ruiz-Hitzky, E.; Van Meerbeck, A. V. Coll. Poly. Sci. (1978), 256, 135.
Van Meerbeck, A. V.; Ruiz-Hitzky, E. Coll. Poly. Sci. (1979), 257, 178.
Zapata, L.; Castelein, J.; Mercier, J. P.; Fripiat, J. J. Bull. Soc. Chim. Fr. (1972), 54.
Zapata, L.; Van Meerbeck, A.; Fripiat, J. J.; Faille, M. D.; Van Russelt, M.; Mercier, J. P. J. Polym. Soc., Polym. Symp. (1973), 42, 257.
Yanagisawa, T.; Marayama, M.; Kuroda, K.; Kato, C. Solid State Ionics (1990), 42, 15.
Hefter, J. Ph.D. Thesis, Case Western Reserve University, 1981.
Hefter, J.; Kenney, M. E. In Soluble Silicates, Falcone, J. S. Jr. Ed.; ACS Symposium Series 194; Am. Chem. Soc.: Washington, DC, 1982; p. 319.
Bleiman, C.; Mercier, J. P. Inorg. Chem. (1975), 14, 2853.

*Primary Examiner*—Ralph H. Dean
*Attorney, Agent, or Firm*—James L. DeCesare

[57] ABSTRACT

Organopolysiloxane sheet or tube polymers are made by contacting a sheet or tube silicate with an alkenyl group containing chlorosilane to form an alkenylsiloxy polymer, and subsequently contacting the alkenylsiloxy sheet or tube polymer with a hydrosilane or hydrosiloxane in the presence of a hydrosilation catalyst, to catalyze a reaction between the alkenyl group on the alkenylsiloxy polymer and hydride functionality on the hydrosilane or hydrosiloxane. Silylalkoxysiloxane sheet or tube polymers are made by contacting a sheet or tube silicate with an acidic solution of an alkenyl alcohol to form a polymeric sheet or tube alkenyloxysiloxane, and subsequently contacting the alkenyloxysiloxane with a hydrosilane or hydrosiloxane in the presence of a hydrosilation catalyst, to catalyze a reaction between the alkenyl group on the alkenyloxysiloxane and hydride functionality on the hydrosilane or hydrosiloxane.

20 Claims, No Drawings

SHEET AND TUBE SILOXANE POLYMERS

BACKGROUND OF THE INVENTION

This invention is directed to silicone compounds, and methods of making silicate-based sheet and tube type siloxane polymers.

Silicones are made from silica by reducing it in an electric furnace to silicon metal, i.e.

$$SiO_2 + 2\,C \rightarrow Si + 2\,CO$$

The silicon metal is treated with RCl, typically methyl chloride, in the "Direct Process", as the basis of commercial production, i.e.

$$Si + 2\,RCl \rightarrow R_2SiCl_2$$

Hydrolysis of the organochlorosilanes gives siloxane structures which are used in the manufacture of many silicone products, i.e.

$$nMe_2SiCl_2 + 2nH_2O \rightarrow n[Me_2Si(OH)_2] + 2nHCl \rightarrow n[Me_2Si(OH)_2] \rightarrow HO(Me_2SiO)_nH + (n-1)\,H_2O$$

Alternative routes to silicones involving the preparation of silicone polymers from silicate materials are embodied in U.S. Pat. No. 3,661,846 (May 9, 1972). This invention is an improvement and furtherance of the efforts described in the '846 patent to find other unique approaches in the manufacture of silicones.

BRIEF SUMMARY OF THE INVENTION

One object of this invention is to provide new, simple, and versatile routes, to siloxane polymers having segments derived from silicate structures by using readily accessible starting materials, that in many cases, give nontoxic byproducts. Another object is to prepare distinctively shaped organosiloxanes, useful as additives in conventional amorphous silicone materials such as resins, fluids, and gums; and to create "supramolecular" structures that offer benefits in the areas of gels, cosmetics, rheological additives, greases, elastomers, sealants, fire resistant materials, and molecular reinforcement.

These and other objects of the invention will become apparent from a consideration of the detailed description.

DETAILED DESCRIPTION

The invention relates to the synthesis and characterization of copolymers having organosiloxane or organopolysiloxane segments and silicate derived segments, where the silicate derived segments have unique supramolecular structures such as tubular or sheet structures. The polymers are derived from naturally occurring or synthetic sheet silicates and synthetic tube silicates by a two-step process.

The first step consists of the reaction of a monofunctional silane that contains at least one unsaturated group with a sheet silicate or a tube silicate to produce a sheet-like or tube-like organosiloxane polymer. The organosilane is represented with the general formula RR'R"SiCl.

The sheet silicate apophyllite $KFCa_4Si_8O_{20} \cdot 8H_2O$ is a commercially available crystalline mineral. It may be purchased from supply houses such as Ward's Natural Science Establishment, Rochester, N.Y. The tube silicate $K_2CuSi_4O_{10}$ is a synthetic material. Methods of preparing this synthetic silicate are described in various publications including U.S. Pat. No. 4,942,026 (Jul. 17, 1990); *J. Polym. Prepr.* (Am. Chem. Soc., Div. Polym. Chem.) 1991, 32(3), 508–509; and *Colloids and Surfaces*, 1992, 63, 139–149.

Below is a simplification of the first step of the process.

Scenario A apophyllite sheet silicate + RR'R"SiCl → alkenylsiloxy sheet polymer In the alkenyl (olefin) group containing chlorosilane RR'R"SiCl, the R' and R" groups are alkyl radicals with 1–6 carbon atoms, such as methyl, ethyl, propyl, butyl, pentyl, and hexyl; and R is an alkenyl radical with 1–16 but preferably 1–8 carbon atoms such as vinyl, allyl, hexenyl, and octenyl. Some representative olefin functional chlorosilanes are vinyldimethylchlorosilane, allyldimethylchlorosilane, 5-hex-1-enyldimethylchlorosilane, and 7-oct-1-enyldimethylchlorosilane.

In this reaction, the chlorine reacts directly or indirectly with cations (i.e. $Ca^{2+}$) of the silicate.

Some specific embodiments representative of Scenario A are shown below:

---

Scenario A-1 apophyllite (sheet silicate) + vinyldimethylchlorosilane
$KFCa_4Si_8O_{20} \cdot 8H_2O + H_2C = CHSi(CH_3)_2Cl \rightarrow$
$[(CH_2 = CH(CH_3)_2SiO)_x(HO)_{1-x}SiO_{1.5}]n$
vinyldimethylsiloxy sheet polymer Scenario A-2 apophyllite + 7-oct-1-enyldimethylchlorosilane
$KFCa_4Si_8O_{20} \cdot 8H_2O + H_2C = 0\,CH(CH_2)_6Si(CH_3)_2Cl \rightarrow$
$[(CH_2 = CH(CH_2)_6(CH_3)_2SiO)_x(HO)_{1-x}SiO_{1.5}]n$
octenyldimethylsiloxy sheet polymer

---

The same scenario is possible with tube silicates such as potassium copper silicate shown below:

---

Scenario A'-1 potassium copper tube silicate + RR'R"SiCl →
alkenylsiloxy tube polymer

Scenario A'-1 tube silicate + vinyldimethylchlorosilane
$K_2CuSi_4O_{10} + H_2C = CHSi(CH_3)_2Cl \rightarrow$
$[(CH_2 = CH(CH_3)_2SiO)_x(HO)_{1-x}SiO_{1.5}]n$
vinyldimethylsiloxy tube polymer Scenario A'-2 tube silicate + 7-oct-1-enyldimethylchlorosilane
$K_2CuSi_4O_{10} + H_2C=CH(CH_2)_6Si(CH_3)_2Cl \rightarrow$
$[(CH_2 = CH(CH_2)_6(CH_3)_2SiO)_x(HO)_{1-x}SiO_{1.5}]n$
octenyldimethylsiloxy tube polymer

---

The second step involves the controlled reaction of the unsaturated groups of the polymer formed in the first step with a hydrosilane or hydrosiloxane to produce another sheet organosiloxane polymer or another tube organosiloxane polymer.

The term hydrosilation applies to the addition of Si—H across any unsaturated species, i.e.

$$\equiv SiH + CH_2 = CHSi\equiv \rightarrow \equiv Si-CH_2CH_2-Si\equiv \text{ or}$$

$$\equiv SiH + CH_2 = CHR \rightarrow \equiv Si-CH_2CH_2-R.$$

Silanes and siloxanes that contain a silicon bound hydrogen atom can add across the double bond. Typically, the reaction is conducted in the presence of a platinum catalyst or a catalyst which is a complex of platinum.

The degree of unsaturation of the final polymer is partly controlled by the type of starting hydrosilane or hydrosiloxane, and partly controlled by the type of intermediate polymer used. The intermediate and final layer polymers have increased inter-layer spacings over that of the starting minerals. The magnitude of spacing depends upon the size of the chlorosilane used in Step 1 and hydrosilane used in Step 2.

For example, apophyllite has an inter-layer d spacing of 8.7 Å, the vinyldimethylsiloxy apophyllite sheet polymer has an inter-layer d spacing of 16 Å based on powder X-ray Diffractomery (XRD), and the octenyldimethylsiloxy apophyllite polymer has an inter-layer d spacing of 24 Å. These differences can impact performance of the sheet and tube materials in their application as fillers, rheology modifiers, or molecular reinforcing agents for silicone fluids, elastomers, and resins.

The hydrosilation reaction of the intermediate polymer proceeds nearly quantitatively to produce the final polymer. In the final polymer, practically all unsaturated groups are silylated. Thus, the octenyldimethylsiloxy sheet polymer can be practically quantitatively hydrosilated with dimethylethoxysilane and with pentamethyldisiloxane using chloroplatinic acid as catalyst. The inter-layer spacing of the sheet polymers so produced increases to 27 Å and 35 Å, respectively. Fourier transform infrared spectroscopy confirms practically complete hydrosilation of the —C=C— double bonds and formation of ≡Si—C≡ bonds. Similar hydrosilation of the octenyldimethylsiloxy sheet polymer with HMe$_2$SiO(Me$_2$SiO)$_{\sim 6}$Me$_2$SiH produces a final sheet polymer with an even larger inter-layer spacing 39 Å.

The hydrosilation reactions described herein are heterogeneous processes that take place on the surface of the intermediate sheet polymer, and are presumed to take place on the surface of the intermediate tube siloxanes.

These materials have potential and offer a variety of benefits in areas such as gels, cosmetics, rheological additives, greases, elastomers, sealants, fire resistant polymers, molecular reinforcement agents, and resins. Examples of some potential benefits are (A) gels with controlled rheological properties formed between silicone fluids and the intermediate or final polymers with various d spacings; (B) silicone resins molecularly reinforced by the exfoliation of the intermediate or final polymers; (C) supramolecular structures produced by tying up the intermediate or final polymers with reactive siloxane matrices (i.e., fluids, gums, or resins) utilizing hydrosilation, peroxide catalysis, or other curing process; and (D) control in permeability properties.

Some scenarios representative of the second hydrosilation step are shown below:

Scenario A"- Hydrosilation alkenylsiloxy sheet polymer + hydrosilane/hydrosiloxane $\xrightarrow{Pt}$
organosiloxane sheet polymer Scenario A"-1 vinyldimethylsiloxy sheet polymer + pentamethyldisiloxane

[(CH$_2$ = CH(CH$_3$)$_2$SiO)$_x$(HO)$_{1-x}$SiO$_{1.5}$]n + $\xrightarrow{Pt}$
Me$_2$HSiOSiMe$_3$
[(CH$_3$)$_3$SiO(CH$_3$)$_2$Si(CH$_2$)$_2$(CH$_3$)$_2$SiO)$_x$(HO)$_{1-x}$SiO$_{1.5}$]n
organosiloxane sheet polymer Scenario A"-2 octenyldimethylsiloxy sheet polymer + dimethylethoxysilane

[(CH$_2$ = CH(CH$_2$)$_6$(CH$_3$)$_2$SiO)$_x$(HO)$_{1-x}$SiO$_{1.5}$]n + Me$_2$HSiOEt $\xrightarrow{Pt}$
[(C$_2$H$_5$O)(CH$_3$)$_2$Si(CH$_2$)$_8$(CH$_3$)$_2$SiO)$_x$(HO)$_{1-x}$SiO$_{1.5}$]n
organosiloxane sheet polymer Scenario A"-3 octenyldimethylsiloxy sheet polymer + pentamethyldisiloxane

[(CH$_2$ = CH(CH$_2$)$_6$(CH$_3$)$_2$SiO)$_x$(HO)$_{1-x}$SiO$_{1.5}$]n + Me$_2$HSiOSiMe$_3$ $\xrightarrow{Pt}$
[(CH$_3$)$_3$SiO(CH$_3$)$_2$Si(CH$_2$)$_8$(CH$_3$)$_2$SiO)$_x$(HO)$_{1-x}$SiO$_{1.5}$]n
organosiloxane sheet polymer Scenario A"-4 octenyldimethylsiloxy sheet polymer + heptamethyltrisiloxane

[(CH$_2$ = CH(CH$_2$)$_6$(CH$_3$)$_2$SiO)$_x$(HO)$_{1-x}$SiO$_{1.5}$]n + (Me$_3$SiO)$_2$MeSiH $\xrightarrow{Pt}$
[(CH$_3$)$_3$SiO)$_2$(CH$_3$)Si(CH$_2$)$_8$(CH$_3$)$_2$SiO)$_x$(HO)$_{1-x}$SiO$_{1.5}$]n
organosiloxane sheet polymer Scenario A"-5 octenyldimethylsiloxy sheet polymer +
[(CH$_2$ = CH(CH$_2$)$_6$(CH$_3$)$_2$SiO)$_x$(HO)$_{1-x}$SiO$_{1.5}$]n +
hexadecamethyloctasiloxane
Me$_2$HSiO(Me$_2$SiO)$_{\sim 6}$SiHMe$_2$ $\xrightarrow{Pt}$

[(HO)(CH₃)₂SiO((CH₃)₂SiO)₋₆(CH₃)₂Si(CH₂)ₐ
(CH₃)₂SiO)ₓ
(HO)₁₋ₓSiO₁.₅]n
organosiloxane sheet polymer The same second-step hydrosilation scenario is possible with potassium copper tube silicate derived organosiloxane polymers as shown below:

Scenario A'''- Hydrosilation alkenylsiloxy tube polymer + hydrosilane or hydrosiloxane →[Pt] organosiloxane tube polymer Scenario A'''-1 vinyldimethylsiloxy tube polymer + pentamethyldisiloxane

[(CH₂ = CH(CH₃)₂SiO)ₓ(HO)₁₋ₓSiO₁.₅]n + →[Pt]
Me₂HSiOSiMe₃
[(CH₃)₃SiO(CH₃)₂Si(CH₂)₂(CH₃)₂SiO)ₓ(HO)₁₋ₓSiO₁.₅]n
organosiloxane tube polymer Ideally, equivalent amounts of ≡Si—H containing reactant and unsaturated olefin group containing sheet or tube polymer reactant should be employed in the process, and one ethylenic linkage is the theoretical equivalent of one silicon bonded hydrogen atom. It may be necessary however to use an excess of the ≡SiH reactant to totally consume the unsaturated olefin group containing sheet or tube polymer reactant.

The maximum amount of platinum catalyst employed is determined by economical considerations, and the minimum amount by the type and purity of reactants employed. Very low concentrations of platinum catalyst such as $1 \times 10^{-10}$ moles of catalyst per equivalent of the olefin group containing sheet or tube polymer, may be used when the reactants are extremely pure. However, it is possible to use about $1 \times 10^{-8}$ moles catalyst per equivalent weight of sheet or tube polymer, and even $1 \times 10^{-7}$ to $5 \times 10^{-2}$ moles platinum catalyst, per equivalent weight of sheet or tube polymer.

"Moles" of platinum catalyst are measured in terms of one mole providing one unit atom (e.g. one gram atom) of platinum. An "equivalent weight" of olefin is the amount of reactant furnishing one unit weight of ethylenic unsaturation (i.e. equivalent to one unit weight of ≡Si—H), regardless of what other reactive or potentially reactive substitutents may be present. Thus, an equivalent weight of ethylene is its molecular weight.

The preferred hydrosilation catalyst is the platinum complex chloroplatinic acid $H_2PtCl_6 \cdot xH_2O$ which is commercially available from Aldrich Chemical Company, Inc., Milwaukee, Wis. Other platinum-based catalysts can be employed, however, such as platinum supported on active carbon particles having a diameter of 1–2 mm. The amount of platinum supported on the active carbon can vary from 0.1–5% by weight based on the weight of active carbon. The platinum-on-carbon catalyst can be dried so that it is anhydrous. Other platinum complexes such as platinum acetylacetonate, or chloroplatinic acid complexed with divinyltetramethyldisiloxane and diluted in dimethylvinylsiloxy endblocked polydimethylsiloxane, can also be used. Reference may be had to any of the following U.S. Patents for appropriate hydrosilation catalysts, i.e. U.S. Pat. Nos. 2,823, 218, 3,419,359, 3,419,593, 3,445,420, 3,697,473, 3,814,731, 3,890,359, and 4,123,604.

The reaction temperature can vary, and optimum temperatures depend upon the concentration of platinum catalyst, and the nature of the reactants. The reaction can be initiated at a temperature below room temperature (0° to −10° C.). The maximum temperature is determined by the stability of the reactants. Ordinarily, it is best to keep the reaction temperature below about 300° C. Best results with most reactants are obtained by carrying out the reaction at about 60° to 180° C. Heat generated by the reaction may raise the temperature up to 200°–250° C. for a short time, however.

The optimum reaction time is a variable depending upon the reactants, reaction temperature, and platinum catalyst concentration. Ordinarily, there is no benefit in extending the contact time of the reactants beyond 36 hours, but likewise there is usually no harm, unless an extremely elevated temperature is employed. With many reactants, a practical quantitative yield of product can be obtained in about 3–4 hours.

The reaction can be carried out at atmospheric, subatmospheric, or super-atmospheric pressure. Here again, the choice of conditions is largely a matter of logic, based upon the nature of the reactants, and the equipment available. Non-volatile reactants are especially adaptable to being heated at atmospheric pressure, with or without a reflux arrangement. Reactants which are gaseous at ordinary temperatures, are preferably reacted at substantially constant volume under autogenous or induced pressure.

The hydrosilane or hydrosiloxane for use in the second step hydrosilation can be any silicon hydride with not more than two hydrogen atoms attached to any one silicon atom.

It can be a monomer such as $HSiR_3$, $H_2SiR_2$, $R_2HSi(OR)$, or $RHSi(OR)_2$. It can also be a polymer or copolymer such as $R_2HSiO(R_2SiO)_aSiR_2H$, $R_3SiO(R_2SiO)_aSiR_2H$, $R_3SiO(RHSiO)_bSiR_3$, $R_3SiO(R_2SiO)_a(RHSiO)_bSiR_3$, or $(RHSiO)_c$.

Preferably, R is an alkyl radical such as methyl and ethyl; an aryl radical such as phenyl; or an aralkyl radical such as benzyl. The value for a is zero or any positive number. The value for b is any positive number, and c has a value of 3 or more.

Examples of some suitable hydrosilanes are
benzyldimethylsilane $C_6H_5CH_2SiHMe_2$,
t-butyldimethylsilane $t\text{-}BuMe_2SiH$,
di-t-butylmethylsilane $t\text{-}Bu_2MeSiH$,
diethylsilane $Et_2SiH_2$,
diethylmethylsilane $Et_2MeSiH$, dimethylsilane $Me_2SiH_2$,
dimethylethoxysilane $Me_2EtOSiH$,
diphenylsilane $(C_6H_5)_2SiH_2$,
diphenylmethylsilane $(C_6H_5)_2MeSiH$,
ethyldimethylsilane $EtMe_2SiH$,
hexyldimethoxysilane $n\text{-}C_6H_{13}(MeO)_2SiH$,
isobutyldiethoxysilane $i\text{-}C_4H_9(EtO)_2SiH$,
methyldimethoxysilane $CH_3(MeO)_2SiH$,
methylphenylsilane $CH_3C_6H_5SiH_2$,
phenyldimethylsilane $C_6H_5Me_2SiH$,
triethoxysilane $(EtO)_3SiH$,
triethylsilane $Et_3SiH$,
tri-n-hexylsilane $(n\text{-}C_6H_{13})_3SiH$,
tri-isopropylsilane $(Me_2CH)_3SiH$,
trimethoxysilane $(MeO)_3SiH$,
trimethylsilane $Me_3SiH$,
tri-n-octylsilane $(n\text{-}C_8H_{17})_3SiH$,
triphenylsilane $(C_6H_5)_3SiH$, and
tri-n-propylsilane $(CH_2CH_2CH_2)_3SiH$.

Examples of some suitable hydrosiloxanes are
bis-(trimethylsiloxy)dimethyldisiloxane
$Me_3SiO(MeHSiO)_2SiMe_3$
bis-(trimethylsiloxy)methylsilane $Me_3SiO(MeHSiO)_2SiMe_3$,
diphenyldimethyldisiloxane $HC_6H_5MeSiOSiMeC_6H_5H$,
heptamethyltrisiloxane $Me_3SiO(Me_2SiO)SiMe_2H$,
hexadecamethyloctasiloxane $HMe_2SiO(Me_2SiO)_6SiMe_2H$,
hexamethyltrisiloxane $HMe_2SiO(Me_2SiO)SiMe_2H$,
octamethyltetrasiloxane $HMe_2SiO(Me_2SiO)_2SiMe_2H$,
pentamethylcyclopentasiloxane $(MeHSiO)_5$,
pentamethyldisiloxane $Me_3SiOSiMe_2H$,
tetraisopropyldisiloxane $H[(CH_3)_2CH]SiOSi[CH(CH_3)_2]H$,
tetramethyldisiloxane $HMe_2SiOSiMe_2H$, and
tetramethylcyclotetrasiloxane $(MeHSiO)_4$.

Another scenario involves synthesis and characterization of new and unique polymeric silylalkoxysiloxanes with distinctively shaped molecular structures. These silylalkoxysiloxanes are derived from silicates with closely related structures. The silylalkoxysiloxanes have potential as useful reinforcing agents for organosilicon elastomers and composites because of their unique molecular structures.

According to this scenario, polymeric silylalkoxysiloxanes derived from polymeric silicates are prepared by treating the silicates with acidic alcohol solutions under controlled conditions. These polymeric silylalkoxysiloxanes are then converted to polymeric alkenylalkoxyalkoxysiloxanes by treating them with alkenyl alcohols. Finally, the polymeric alkenylalkoxyalkoxysiloxanes are converted to polymeric silylalkoxysiloxanes by hydrosilylating them.

These polymers were characterized by Fourier transform infrared spectroscopy (FTIR) and powder X-ray diffractomery (XRD).

Some scenarios representative of this embodiment are shown below:

---

Scenario B - Step 1 - Alkoxylation apophyllite sheet silicate + 1-propanol + HCl
$KFCa_4Si_8O_{20} \cdot 8H_2O + CH_3CH_2CH_2OH \rightarrow$
$[(C_3H_7O)_x(HO)_{1-x}SiO_{1.5}]n$
propoxy sheet polymer Scenario B- Step 2 - Alkoxylation propoxy sheet polymer + 1-propanol + undecylenyl alcohol
HCl
$[(C_3H_7O)_x(HO)_{1-x}SiO_{1.5}]n + \rightarrow$
$CH_3CH_2CH_2OH + CH_2 = CH(CH_2)_8CH_2OH$
$[(CH_2 = CH(CH_2)_9O)_x(C_3H_7O)_y(HO)_{1-x-y}SiO_{1.5}]n$
mixed propoxy and undecylenyloxy siloxane sheet polymer

---

Scenario B - Step 3 - Hydrosilation alkenyloxysiloxane sheet polymer
$[(CH_2 = CH(CH_2)_9O)_x(C_3H_7O)_y(HO)_{1-x-y}SiO_{1.5}]n +$
hexadecamethyloctasiloxane
Pt
$Me_2HSiO(Me_2SiO)_6SiHMe_2 \rightarrow$
$[(HO)(CH_3)_2SiO(CH_3)_2SiO)_6(CH_3)_2Si(CH_2)_{11}O)_x$
$(C_3H_7O)_y$
$(HO)_{1-x-y}SiO_{1.5}]n$
silylalkoxysiloxane sheet polymer

---

Alcohols suitable for use in this embodiment include the various common primary and secondary alkyl alcohols such as methyl alcohol, ethyl alcohol, propyl alcohol, isopropyl alcohol, butyl alcohol, pentyl alcohol, and hexyl alcohol, for example; and alkenyl alcohols such as allyl alcohol $H_2C=CHCH_2OH$, 3-buten-1-ol $H_2C=CHCH_2CH_2OH$, 5-hexen-1-ol $H_2C=CH(CH_2)_4OH$, 9-decen-1-ol $H_2C=CH(CH_2)_8OH$, and 10-undecen-1-ol $H_2C=CH(CH_2)_8CH_2OH$. Treatment with the alcohols can be conducted separately or in a single step.

In Step 1 of the above scenario, at least one mole of HCl for each pendent oxygen is required, but preferably about 5–10 moles is employed. In Step 2 of the above scenario, very low ratios of HCl to polymer can be used, for example $1 \times 10^{-3}$ moles of HCl per mole of polymer. However, it is preferable to use about 5–10 moles of HCl per mole of polymer. Other strong acids can also be used such as hydrobromic acid and hydriodic acid.

Solvents useful in carrying out processes according to any of the above Scenarios, are those common in the art. Among the many suitable solvents are for example, acetone, methyl ethyl ketone, cyclohexane, benzene, toluene, xylene, pyridine, picoline, quinoline, and dimethylformamide $HCON(CH_3)_2$.

Examples representative of these processes are shown below. Table I shows a correlation between Scenarios described above and the examples which follow.

TABLE I

| Scenario | Example |
|---|---|
| A | — |
| A-1 | 1 |
| A-2 | 2 |
| A' | — |
| A'-1 | 3 |
| A'-2 | 4 |
| A" | — |
| A"-1 | 5 |
| A"-2 | 6 |
| A"-3 | 7 |
| A"-4 | 8 |
| A"-5 | 9 |
| A'" | — |
| A'"-1 | 10 |
| B-Step 1 | 11 |
| B-Step 2 | 12 |
| B-Step 3 | 13 |

EXAMPLE—PREPARATION OF $K_2CuSi_4O_{10}$

This procedure was patterned after the procedure of U.S. Pat. No. 4,942,026. In succession, a solution of KOAc (15.8 g, 161 mmole) and $H_2O$ (160 mL), $Si(OC_2H_5)_4$ (66.7 g, 320 mmole), and $NH_4OH$ (30 wt. % 2.0 mL 51 mmole) were added to a stirred mixture of $Cu(OAc)_2 \cdot H_2O$ (16.1 g, 80.6 mmole) and ethanol (320 mL) which was maintained at 40°

C. (oil bath). The resulting mixture was stirred at room temperature for 3 days, allowed to stand for 2 days, and evaporated to dryness with a rotary evaporator (~80 torr, 70° C.). The solid was dried (~80 torr, 90° C.) for 24 h, ground to a powder, heated (Pt crucible, 200° C.) under a slow flow of air (~100 mL/min) for 24 h, further heated (Pt crucible, 590° C.) under a slow flow of air (~100 mL/min) for 19 h, pelletized, and heated (Pt crucible, 750° C.) under a slow flow of $N_2$ (~100 mL/min) for 7 days. The composition of the resultant was verified by comparison of its X-ray powder pattern with literature powder pattern data (30.0 g, 72.4 mmole, 91% based on $Si(OC_2H_5)_4$). XRD (d(Å) (I/Io)): 3.22 (100), 4.12 (53), 3.07 (42), 3.36 (41), 2.67 (29). The compound was a bluish-purple solid.

EXAMPLE 1

Preparation of
$[(CH_2=CH(CH_3)_2SiO)_x(HO)_{1-x}SiO_{1.5}]_n$
Apophyllite-derived sheet polymer A mixture of apophyllite $KFCa_4Si_8O_{20}\cdot 8H_2O$ (120 mesh, 706 mg, 0.764 mmole), vinyldimethylchlorosilane (4.60 g, 38.1 mmole) and dimethylformamide (20.0 mL, 258 mmole) was refluxed for 4 h, and the resultant was filtered and washed with acetone (2 times, 25 mL each time), a solution of water and acetone (1:1, 2 times, 100 mL each time), acetone (2 times, 50 mL each time), and dried (90° C.,~80 torr, 1 h) (682 mg). XRD (d(Å) (I/Io)) :16.1(100), 4.7(br, 10). IR (Fluorolube, Nujol mulls, $cm^{-1}$): 3628 (m, free OH stretch), 3470 (m br, hydrogen-bonded OH stretch), 3051 (w, C=C—H stretch), 3013 (vw, C=C—H stretch), 2961 (s, CH stretch), 2923 (m sh, CH stretch), 2853 (w, CH stretch), 1596 (w, C=C deformation), 1409 (s, CH deformation), 1255 (m, $SiCH_3$ deformation), 1207 (m sh, SiOSi stretch), 1122 (s sh, SiOSi stretch), 1065 (vs br, SiOSi stretch), 954 (w), 840 (m, SiC stretch), 789 (m), 520 (w), 434(m). $^{29}Si$ MAS-NMR (400 MHz, TMS as primary reference, 4200 Hz, ~25° C.): δ 2.01 (s, $Si(CH_3)_2$), −100.2(s, SiOH), −109.2(s, $SiO_4$). XPS (Si 2p, binding energy, deconvoluted spectrum, eV): 103.7 ($SiO_4$), 101.8 ($Si(CH_3)_2$), 99.71. Level of substitution on the basis of the areas of the SiOH and $SiO_4$ $^{29}Si$ resonances after they had been deconvoluted (%). Found, 53. Level of substitution on the basis of the areas of the $SiO_4$ and $Si(CH_3)_2$ peaks in the deconvoluted XPS spectrum (%). Found, 57. Yield of polymer on the basis of a level of substitution of 54% (mmole, %). Found, 5.95, 97. The compound was a white solid. It dispersed in but did not dissolve in hexane or toluene. It was very hydrophobic and it did not mix with or disperse in $H_2O$.

EXAMPLE 2

Preparation of
$[(CH_2=CH(CH_2)_6(CH_3)_2SiO)_x(HO)_{1-x}SiO_{1.5}]_n$
Apophyllite-derived sheet polymer A suspension of apophyllite (100 mesh, 3.00 g, 3.25 mmole), 7-oct-1-enyldimethylchlorosilane (20.0 mL, 78.1 mmole) and dimethylformamide (85.0 mL, 1.10 mole) was refluxed for 3 h, and the resultant was filtered and washed with acetone (2 times, 50 mL each time), a solution of water and acetone (1:1, 4 times, 100 mL each time), acetone (2 times, 50 mL each time), and dried (92° C.,~30 torr, 3 h) (3.28 g). XRD (d(Å) (I/Io)): 23.6 (100), 11.9 (9), 5.0 (br, 13). IR (Fluorolube, Nujol mulls, $cm^{-1}$): 3645 (m, free OH stretch), 3468 (m br, hydrogen-bonded OH stretch), 3087 (w, C=C—H stretch), 2924 (s, CH stretch), 2854 (s, CH stretch), 1641 (w, C=C stretch), 1470 (w, CH deformation), 1414 (w, CH deformation), 1255 (m, $SiCH_3$ deformation), 1207 (m sh, SiOSi stretch), 1062 (vs br, SiOSi stretch), 843 (m, SiC stretch), 790 (w), 434(m). $^{29}Si$ MAS-NMR (400 MHz, TMS as primary reference, 4100 Hz, ~25° C.): δ 14.72 (S, $Si(CH_3)_2$), −99.51 (s, SiOH), −108.0 (s, $SiO_4$). XPS (Si 2p, binding energy, deconvoluted spectrum, eV): 102.4 ($SiO_4$), 100.5 ($Si (CH_3)_2$), 99.49. Level of substitution on the basis of the areas of the SiOH and $SiO_4$ $^{29}Si$ resonances after they had been deconvoluted (%). Found, 53. Level of substitution on the basis of the areas of the $SiO_4$ and $Si(CH_3)_2$ peaks in the deconvoluted XPS spectrum (%). Found, 54. Yield of polymer on the basis of a level of substitution of 53% (mmole, %). Found, 20.7, 80. The compound was an off-white solid. It dispersed in but did not dissolve in hexane or toluene. It was very hydrophobic and it did not mix with or disperse in $H_2O$.

EXAMPLE 3

Preparation of
$[(CH_2=CH(CH_3)_2SiO)_x(HO)_{1-x}SiO_{1.5}]_n$ $K_2CuSiO_4$
derived tube polymer A suspension of $K_2CuSi_4O_{10}$ (100 mesh; 252 mg, 0.609 mmole), vinyldimethylchlorosilane (3.80 g, 31.5 mmole) and dimethylformamide (6.00 mL) was refluxed for 24 h, stirred at room temperature for 64 h, and the resultant was filtered, washed with acetone (2 times, 25 mL each time), a solution of water and acetone (1:1, 2 times, 50 mL each time) and acetone (2 times, 25 mL each time), and dried (90° C., ~80 torr, 1 h) (225 mg). XRD (d(Å) (I/Io)): 16.4 (100), 9.26 (21), 8.04 (18), 4.6 (br, 25). IR (Fluorolube, Nujol mulls, $cm^{-1}$): 3624 (m br, hydrogen-bonded OH stretch), 3049 (w, C=C—H stretch), 2960 (s, CH stretch), 2928 (s, CH stretch), 2855 (w, CH stretch), 1596 (w, C=C stretch), 1408 (m, CH deformation), 1255 (w, $SiCH_3$ deformation), 1160 (m sh, SiOSi stretch), 1079 (vs br, SiOSi stretch), 841 (m, SiC stretch), 788 (m), 459 (m). The polymer was a blue solid. It dispersed in but did not dissolve in hexane or toluene. It was very hydrophobic and it did not mix with or disperse in $H_2O$.

EXAMPLE 4

Preparation of
$[(CH_2=CH(CH_2)_6(CH_3)_2SiO)_x(HO)_{1-x}SiO_{1.5}]_n$
$K_2CuSiO_4$ derived tube polymer A suspension of $K_2CuSi_4O_{10}$ (100 mesh; 252 mg, 0.609 mmole), 7-oct-1-enyldimethylchlorosilane (6.20 g, 30.3 mmole) and dimethylformamide (6.00 g) was stirred at room temperature for 35 days, and the resultant was filtered and washed with acetone (2 times, 25 mL each time), a solution of water and acetone (1:1, 2 times, 50 mL each time) and acetone (2 times, 25 mL each time), and dried (90° C., ~80 torr, 1 h) (374 mg). XRD (d(Å) (I/Io)): 20.1 (100), 4.8 (br, 23). IR (Fluorolube, Nujol mulls, $cm^{-1}$): 3651 (m, free OH stretch), 3480 (m br, hydrogen-bonded OH stretch), 3077 (w, C=C—H stretch), 2924 (s, CH stretch), 2854 (s, CH stretch), 1641 (w, C=C stretch), 1457 (w, CH deformation), 1414 (w, CH deformation), 1253 (m, $SiCH_3$ deformation), 1163 (m sh, SiOSi stretch), 1079 (vs br, SiOSi stretch), 978 (w), 909 (w), 844 (m), 790 (w), 462 (m). The polymer was a blue solid. It dispersed in but did not dissolve in hexane or toluene. It was very hydrophobic and it did not mix with or disperse in $H_2O$.

EXAMPLE 5

Vinyldimethylsiloxy sheet polymer derived sheet polymer $[((CH_3)_3SiO(CH_3)_2Si(CH_2)_2 \quad (CH_3)_2SiO)_x(HO)_{1-x}SiO_{1.5}]_n$ A mixture of the vinyldimethylsiloxy sheet polymer (103 mg, 0.910 mmole assuming a 50% level of substitution), pentamethyldisiloxane (3.30 g, 22.2 mmole) and a solution composed of $H_2PtCl_6.xH_2O$ (10 mg) and ethanol (1.0 mL) was heated (~75° C.) with stirring for 24 h, and the resultant was filtered, washed with acetone (2 times, 25 mL each time), and dried (90° C., ~80 torr, 1 h) (50.0 mg). XRD (d(Å) (I/Io)): 25.6 (100), 12.8 (13), 5.2 (br, 13). IR (Fluorolube, Nujol mulls, cm$^{-1}$): 3480 (w br, hydrogen-bonded OH stretch), 2958 (s, CH stretch), 2925 (m, CH stretch), 2858 (w, CH stretch), 1408 (m, CH deformation), 1254 (s, SiCH$_3$ deformation), 1208 (m sh, SiOSi stretch), 1122 (s sh, SiOSi stretch), 1062 (vs br, SiOSi stretch), 973 (w), 841 (s, SiC stretch), 789 (m), 750 (w), 434 (m). No C=C—H or C=C bands were observed in the infrared spectrum of this polymer. It was a gray solid. It dispersed in but did not dissolve in hexane or toluene. The polymer was very hydrophobic and it did not mix with or disperse in H$_2$O.

EXAMPLE 6

Octenyldimethylsiloxy sheet polymer derived sheet polymer $[(C_2H_5O(CH_3)_2Si(CH_2)_8 (CH_3)_2SiO)_x(HO)_{1-x}SiO_{1.5}]_n$ A suspension of the octenyldimethylsiloxy sheet polymer (80.0 mg, 0.522 mmole, assuming a 50% level of substitution), dimethylethoxysilane (3.50 g, 33.6 mmole) and a solution composed of $H_2PtCl_6.xH_2O$ (12 mg) and ethanol (1.0 mL) was heated (~85° C.) with stirring for 24 h, and the resultant was filtered and washed with ethanol (4 times, 25 mL each time), acetone (2 times, 25 mL each time), and dried (90° C., ~80 torr, 1 h) (25.0 mg). XRD (d(Å) (I/Io)): 27.2 (100), 14.3 (20), 5.2 (br, 13). IR (Fluorolube, Nujol mulls, cm$^{-1}$): 3480 (m br, hydrogen-bonded OH stretch), 2957 (m, CH stretch), 2922 (s, CH stretch), 2854 (s, CH stretch), 1470 (w, CH deformation), 1410 (w, CH deformation), 1256 (m, SiCH$_3$ deformation), 1200 (m sh, SiOSi stretch), 1120 (s sh, SiOSi stretch), 1064 (vs br, SiOSi stretch), 975 (w), 842 (m, SiC stretch), 790 (w), 432 (m). No C=C—H and C=C bands were observed in the infrared spectrum of this polymer. It was a gray solid. It dispersed in but did not dissolve in hexane or toluene. The polymer was very hydrophobic and it did not mix with or disperse in H$_2$O.

EXAMPLE 7

Octenyldimethylsiloxy sheet polymer derived sheet polymer $[((CH_3)_3SiO(CH_3)_2Si(CH_2)_8 (CH_3)_2SiO)_x(HO)_{1-x}SiO_{1.5}]_n$ A suspension of the octenyldimethylsiloxy sheet polymer (1.00 g, 53% level of substitution, 6.32 mmole), pentamethyldisiloxane (12.2 g, 82.0 mmole) and a solution composed of $H_2PtCl_6.xH_2O$ (50 mg) and 2-propanol (1.0 mL) was heated (~90° C.) with stirring for 3 h, and the resultant was filtered, washed with 2-propanol (25 mL) and acetone (100 mL), and dried (90° C., ~80 torr, 1 h) (1.25 g). XRD (d(Å) (I/Io)): 34.7 (100), 17.5 (18), 11.8 (6), 5.2 (br, 7). IR (Fluorolube, Nujol mulls, cm$^{-1}$): 3485 (m br, hydrogen-bonded OH stretch), 2957 (s, CH stretch), 2922 (vs, CH stretch), 2853 (s, CH stretch), 1470 (w, CH deformation), 1410 (w, CH deformation), 1253 (s, SiCH$_3$ deformation), 1203 (m sh, SiOSi stretch), 1118 (m sh, SiOSi stretch), 1060 (vs br, SiOSi stretch), 968 (w), 842 (s, SiC stretch), 808 (m), 748 (w), 433 (m). $^{29}$Si MAS-NMR (400 MHz, TMS as primary reference, 4200 Hz, ~25° C.): δ 14.44 s, (CH$_2$)$_8$Si (CH$_3$)$_2$), 7.78, 7.19 (d, (CH$_3$)$_3$SiO(CH$_3$)$_2$Si), –98.98 (s, SiOH), –108.2 (s, SiO$_4$). Level of substitution on the basis of the areas of the SiOH and SiO$_4$ $^{29}$Si resonances after they had been deconvoluted (%): 51. Yield of polymer on the basis of a level of substitution of 51% (mmole, %). Found, 5.23, 83. No C=C—H or C=C bands were observed in the infrared spectrum of this polymer. It was an off-white solid. It dispersed in but did not dissolve in hexane or toluene. The polymer was very hydrophobic and it did not mix with or disperse in H$_2$O.

EXAMPLE 8

Octenyldimethylsiloxy sheet polymer derived sheet polymer
$[((CH_3)_3SiO)_2CH_3Si(CH_2)_8(CH_3)_2SiO)_x(HO)_{1-x}SiO_{1.5}]_n$ A suspension of the octenyldimethylsiloxy sheet polymer (184 mg, 53% level of substitution, 1.16 mmole), $((CH_3)_3SiO)_2CH_3SiH$ (6.00 g, 27.0 mmole) and a solution composed of $H_2PtCl_6.xH_2O$ (12 mg) and 2-propanol (1.0 mL) was heated (~140° C.) with stirring for 10 min, and the resultant was filtered, washed with 2-propanol (10 mL) and acetone (50 mL), and air-dried for 10 min (30 mg). XRD (d(Å) (I/Io)): 32.7 (100), 17.0 (23), 11.4 (9), 5.2 (br, 11). IR (Fluorolube, Nujol mulls, cm$^{-1}$): 3504 (m br, hydrogen-bonded OH stretch), 2958 (s, CH stretch), 2923 (vs, CH stretch), 2854 (s, CH stretch), 1470 (w, CH deformation), 1410 (w, CH deformation), 1258 (s, SiCH$_3$ deformation), 1203 (m sh, SiOSi stretch), 1059 (vs br, SiOSi stretch), 958 (w), 842 (s, SiC stretch), 799 (m), 754 (m), 431 (m). No C=C—H or C=C bands were observed in the infrared spectrum of this polymer. The polymer was a white solid. It dispersed in but did not dissolve in hexane or toluene. The polymer was very hydrophobic and it did not mix with or disperse in H$_2$O.

EXAMPLE 9

Octenyldimethylsiloxy sheet polymer derived sheet polymer
$[(HO(CH_3)_2SiO((CH_3)_2SiO)_{\sim6}(CH_3)_2Si(CH_2)_8 (CH_3)_2SiO)_x (HO)_{1-x}SiO_{1.5}]_n$ A suspension of the octenyldimethylsiloxy sheet polymer (100 mg, 0.652 mmole assuming a 50% level of substitution), $H(CH_3)_2SiO((CH_3)_2SiO)_{\sim6}(CH_3)_2SiH$ (5.00 mL, 8.20 mmole) and a solution composed of $H_2PtCl_6.xH_2O$ (12 mg) and ethanol (1.0 mL) was heated (~90° C.) with stirring for 5 h, and the resultant was filtered and washed with ethanol (2 times, 30 mL each time) and acetone (2 times, 25 mL each time), and dried (90° C., ~80 torr, 1 h) (80.0 mg). XRD (d(Å) (I/Io)): 39.3 (100), 19.4 (39), 12.9 (13), 5.3 (br, 14). IR (Fluorolube, Nujol mulls, cm$^{-1}$): 3500 (w br, hydrogen-bonded OH stretch), 2960 (s, CH stretch), 2922 (s, CH stretch), 2854 (s, CH stretch), 1470 (w, CH deformation), 1410 (w, CH deformation), 1260 (m, SiCH$_3$ deformation), 1203 (m sh, SiOSi stretch), 1066 (vs br, SiOSi stretch), 970 (w), 842 (s, SiC stretch), 800 (s), 430 (m). No C=C—H or C=C bands were observed in the infrared spectrum of this polymer. It was a white solid. It dispersed in but did not dissolve in hexane or toluene. The polymer was very hydrophobic and it did not mix with or disperse in H$_2$O.

EXAMPLE 10

Vinyldimethylsiloxy tube polymer derived tube polymer $[(CH_2)_3SiO(CH_3)_2Si(CH_2)_2(CH_3)_2SiO)_x(HO)_{1-x}SiO_{1.5}]_n$ A suspension of the vinyldimethylsiloxy tube polymer (126 mg, 1.11 mmole assuming a 50% level of substitution), pentamethyldisiloxane (4.00 g, 26.9 mmole) and a solution composed of $H_2PtCl_6.xH_2O$ (12 mg) and 2-propanol (1.0 mL) was heated (~85° C.) with stirring for 4 h, and the resultant was filtered, washed with acetone (50 mL), and dried (90° C., ~80 torr, 1 h) (154 mg). XRD (d(Å) (I/Io)): 22.7 (100), 4.9 (br, 57). IR (Fluorolube, Nujol mulls, cm$^{-1}$): 3480 (m br, hydrogen-bonded OH stretch), 2958 (s, CH stretch), 2920 (m sh, CH stretch), 1407 (w, CH deformation), 1253 (s, SiCH$_3$ deformation), 1150 (m sh, SiOSi stretch), 1065 (vs br, SiOSi stretch), 841 (s, SiC stretch), 786 (m), 753 (w), 459 (m). No C=C—H or C=C bands were observed in the infrared spectrum of this polymer. The polymer was a gray solid. It dispersed in but did not dissolve in hexane or toluene. It was very hydrophobic and it did not mix with or disperse in H$_2$O.

EXAMPLE 11

Apophyllite derived sheet polymer
$[(C_3H_7O)_x(HO)_{1-x}SiO_{1.5}]_n$ (Propoxy Sheet Polymer)

A suspension of apophyllite (120 mesh; 13.3 g, 14.4 mmole), a solution of HCl and 1-propanol (9.0N, 70 mL, 0.63 mole of HCl) and 1-propanol (1.00 L, 13.4 mole) was refluxed for 5 h, and the resultant was filtered and washed with acetone (2 times, 100 mL each time), a solution of water and acetone (1:4, 4 times, 250 mL each time), acetone (2 times, 100 mL each time), and dried (90° C., ~80 torr, 1 h) (11.5 g). XRD (d(Å) (I/Io)): 12.1 (100), 6.30 (8), 4.3 (br, 10). IR (Fluorolube, Nujol mulls, cm$^{-1}$): 3420 (m br, hydrogen-bonded OH stretch), 2966 (s, CH stretch), 2940 (s, CH stretch), 2882 (m, CH stretch), 1458 (w, CH deformation), 1366 (w, CH deformation), 1180 (m sh, SiOC, SiOSi stretch), 1066 (vs br, SiOC, SiOSi stretch), 925 (w), 850 (m), 668 (m), 430 (m). Level of substitution on the basis of hydrolysis-gas chromatography data (%). Found, 61. Yield of polymer on the basis of a level of substitution of 61% (mmole, %). Found, 121, 105. From its powder pattern, it appears that the polymer contained SiO$_2$ as an impurity, and that this accounts for the high calculated yield. The polymer was a white solid. It dispersed in but did not dissolve in hexane or toluene. It was very hydrophobic and it did not mix with or disperse in H$_2$O.

EXAMPLE 12

Propoxy sheet polymer derived sheet polymer
$[(CH_2=CH(CH_2)_9O)_x(C_3H_7O)_y(HO)_{1-x-y}SiO_{1.5}]_n$ A suspension of the propoxy sheet polymer (64% level of substitution; 335 mg, 3.49 mmole), a solution of HCl and 1-propanol (9.0N, 2.0 mL, 18 mmole of HCl), and 10-undecen-1-ol (20.0 mL, 99.8 mmole) was refluxed for 2 h, and the resultant was filtered, washed with ethanol (50 mL) and acetone (100 mL), and dried (90° C., ~80 torr, 1 h) (220 mg). XRD (d(Å) (I/Io)): 18.4 (100), 9.40 (10), 4.2 (br, 16). IR (Fluorolube, Nujol mulls, cm$^{-1}$): 3424 (m br, hydrogen-bonded OH stretch), 3076 (w, C=C—H stretch), 2926 (s, CH stretch), 2854 (s, CH stretch), 1640 (w, C=C stretch), 1466 (w, CH deformation), 1206 (m br, SiOSi stretch), 1074 (s br, SiOC, SiOSi stretch), 970 (w), 438 (m). The polymer was a white solid. It dispersed in but did not dissolve in hexane or toluene. It was very hydrophobic and it did not mix with or disperse in H$_2$O.

EXAMPLE 13

Undecenoxypropoxy sheet polymer derived sheet polymer
$[(HO(CH_3)_2SiO((CH_3)_2SiO)_{-6}(CH_3)_2Si(CH_2)_{11}O)_x$
$(C_3H_7O)_y(HO)_{1-x-y}SiO_{1.5}]_n$ The polymer in EXAMPLE 12 was treated with $H(CH_3)_2SiO((CH_3)_2SiO)_{-6}(CH_3)_2SiH$ under conditions similar to those used to hydrosilylate the apophyllite derived sheet polymer $[(CH_2=CH(CH_2)_6(CH_3)_2SiO)_x(HO)_{1-x}SiO_{1.5}]_n$ with $H(CH_3)_2SiO((CH_3)_2SiO)_{-6}(CH_3)_2SiH$ in EXAMPLE 9, and gave polymer $[(HO(CH_3)_2SiO((CH_3)_2SiO)_{-6}$
$(CH_3)_2Si(CH_2)_{11}O)_x(C_3H_7O)_y(HO)_{1-x-y}SiO_{1.5}]_n$.

Other variations may be made in compounds and methods without departing from the essentials of the invention. The forms of invention are exemplary and not limitations on the scope of the invention defined in the claims.

We claim:

1. A method of making an organopolysiloxane sheet or tube polymer comprising contacting a sheet or tube silicate with an alkenyl group containing chlorosilane to form an alkenylsiloxy sheet or tube polymer, and subsequently contacting the alkenylsiloxy sheet or tube polymer with a hydrosilane or hydrosiloxane in the presence of a hydrosilation catalyst, in an amount effective to catalyze a hydrosilation reaction between the alkenyl group on the alkenylsiloxy sheet or tube polymer and hydride functionality on the hydrosilane or hydrosiloxane, to form the organopolysiloxane sheet or tube polymer.

2. A method according to claim 1 in which the sheet silicate is apophyllite KFCa$_4$Si$_8$O$_{20}$.8H$_2$O and the tube silicate is K$_2$CuSi$_4$O$_{10}$.

3. A method according to claim 1 in which the alkenyl group containing chlorosilane is a compound having the formula RR'R"SiCl, where R' and R" are alkyl radicals with 1–6 carbon atoms; and R is an alkenyl radical with 1–8 carbon atoms.

4. A method according to claim 3 in which the alkenyl group containing chlorosilane is a compound selected from the group consisting of vinyldimethylchlorosilane, allyldimethylchlorosilane, 5-hex-1-enyldimethylchlorosilane, and 7-oct-1-enyldimethylchlorosilane.

5. A method according to claim 1 in which the hydrosilane or hydrosiloxane is a compound having a formula selected from the group consisting of HSiR$_3$, H$_2$SiR$_2$, R$_2$HSi(OR), RHSi(OR)$_2$, R$_2$HSiO(R$_2$SiO)$_a$SiR$_2$H, R$_3$SiO(R$_2$SiO)$_a$SiR$_2$H, R$_3$SiO(RHSiO)$_b$SiR$_3$, R$_3$SiO(R$_2$SiO)$_a$(RHSiO)$_b$SiR$_3$, and (RHSiO)$_c$; where R is an alkyl radical, an aryl radical, or an aralkyl radical; a is zero or a positive number; b is a positive number; and c is 3 or more.

6. A method according to claim 5 in which the hydrosilane or hydrosiloxane is a compound selected from the group consisting of dimethylethoxysilane, pentamethyldisiloxane, heptamethyltrisiloxane, and hexadecamethyloctasiloxane.

7. A method according to claim 1 in which the hydrosilation catalyst is chloroplatinic acid.

8. An organopolysiloxane sheet or tube polymer prepared according to the method defined in claim 1.

9. A method of making a silylalkoxysiloxane sheet or tube polymer comprising contacting a sheet or tube silicate with an acidic solution comprising an alkenyl alcohol to form a polymeric sheet or tube alkenyloxysiloxane, and subsequently contacting the alkenyloxysiloxane sheet or tube polymer with a hydrosilane or hydrosiloxane in the presence of a hydrosilation catalyst, in an amount effective to catalyze a hydrosilation reaction between the alkenyl group on the alkenyloxysiloxane sheet or tube polymer and hydride functionality on the hydrosilane or hydrosiloxane, to form the silylalkoxysiloxane sheet or tube polymer.

10. A method according to claim 9 in which the sheet silicate is apophyllite $KFCa_4Si_8O_{20} \cdot 8H_2O$ and the tube silicate is $K_2CuSi_4O_{10}$.

11. A method according to claim 9 in which the alkenyl alcohol is a compound selected from the group consisting of allyl alcohol $H_2C=CHCH_2OH$, 3-buten-1-ol $H_2C=CHCH_2CH_2OH$, 5-hexen-1-ol $H_2C=CH(CH_2)_4OH$, 9-decen-1-ol $H_2C=CH(CH_2)_8OH$, and 10-undecen-1-ol $H_2C=CH(CH_2)_8CH_2OH$.

12. A method according to claim 9 in which the hydrosilane or hydrosiloxane is a compound having a formula selected from the group consisting of $HSiR_3$, $H_2SiR_2$, $R_2HSi(OR)$, $RHSi(OR)_2$, $R_2HSiO(R_2SiO)_aSiR_2H$, $R_3SiO(R_2SiO)_aSiR_2H$, $R_3SiO(RHSiO)_bSiR_3$, $R_3SiO(R_2SiO)_a(RHSiO)_bSiR_3$, and $(RHSiO)_c$; where R is an alkyl radical, an aryl radical, or an aralkyl radical; a is zero or a positive number; b is a positive number; and c is 3 or more.

13. A method according to claim 12 in which the hydrosilane or hydrosiloxane is a compound selected from the group consisting of dimethylethoxysilane, pentamethyldisiloxane, heptamethyltrisiloxane, and hexadecamethyloctasiloxane.

14. A method according to claim 9 in which the hydrosilation catalyst is chloroplatinic acid.

15. A method according to claim 9 in which the acidic solution comprises a mixture of an alkyl alcohol and an alkenyl alcohol.

16. A silylalkoxysiloxane sheet or tube polymer prepared according to the method defined in claim 9.

17. A method of making a silylalkoxysiloxane sheet or tube polymer comprising contacting a sheet or tube silicate with an acidic solution of an alkyl alcohol to form a polymeric sheet or tube alkoxysiloxane, contacting the polymeric sheet or tube alkoxysiloxane with an acidic solution of an alkyl alcohol and an alkenyl alcohol to form an alkenyloxysiloxane sheet or tube polymer, and subsequently contacting the alkenyloxysiloxane sheet or tube polymer with a hydrosilane or hydrosiloxane in the presence of a hydrosilation catalyst, in an amount effective to catalyze a hydrosilation reaction between the alkenyl group on the alkenyloxysiloxane sheet or tube polymer and hydride functionality on the hydrosilane or hydrosiloxane, to form the silylalkoxysiloxane sheet or tube polymer.

18. A method according to claim 17 in which the sheet silicate is apophyllite $KFCa_4Si_8O_{20} \cdot 8H_2O$ and the tube silicate is $K_2CuSi_4O_{10}$.

19. A method according to claim 17 in which the alkenyl alcohol is a compound selected from the group consisting of allyl alcohol $H_2C=CHCH_2OH$, 3-buten-1-ol $H_2C=CHCH_2CH_2OH$, 5-hexen-1-ol $H_2C=CH(CH_2)_4OH$, 9-decen-1-ol $H_2C=CH(CH_2)_8OH$, and 10-undecen-1-ol $H_2C=CH(CH_2)_8CH_2OH$.

20. A silylalkoxysiloxane sheet or tube polymer prepared according to the method defined in claim 17.

* * * * *